United States Patent
Thompson et al.

(10) Patent No.: US 12,329,056 B2
(45) Date of Patent: Jun. 17, 2025

(54) AIR FLOW CONTROL SYSTEM FOR AN AGRICULTURAL SYSTEM

(71) Applicant: CNH Industrial Canada, Ltd., Saskatoon (CA)

(72) Inventors: Dennis George Thompson, Eagle Ridge (CA); Ashish Jagannath Dubey, Saskatoon (CA); Prabhakar Prafulla Pandit, Saskatoon (CA)

(*) Notice: Subject to any disclaimer, the term of this patent is extended or adjusted under 35 U.S.C. 154(b) by 243 days.

(21) Appl. No.: 18/323,560

(22) Filed: May 25, 2023

(65) Prior Publication Data

US 2024/0389497 A1    Nov. 28, 2024

(51) Int. Cl.
A01C 7/08 (2006.01)
A01C 7/06 (2006.01)

(52) U.S. Cl.
CPC ............... A01C 7/084 (2013.01); A01C 7/06 (2013.01)

(58) Field of Classification Search
None
See application file for complete search history.

(56) References Cited

U.S. PATENT DOCUMENTS

| | | | |
|---|---|---|---|
| 6,003,455 A | 12/1999 | Flamme et al. | |
| 6,070,539 A | 6/2000 | Flamme et al. | |
| 6,158,363 A | 12/2000 | Memory et al. | |
| 6,296,425 B1 | 10/2001 | Memory et al. | |
| 6,584,920 B1 | 7/2003 | Cresswell | |
| 8,504,310 B2 | 8/2013 | Landphair et al. | |
| 8,928,486 B2 | 1/2015 | Hui et al. | |
| 9,488,512 B2 * | 11/2016 | Hossain | G01F 1/88 |

(Continued)

FOREIGN PATENT DOCUMENTS

| | | |
|---|---|---|
| CA | 2291598 | 5/2001 |
| CA | 2398143 | 2/2004 |

(Continued)

OTHER PUBLICATIONS

U.S. Appl. No. 18/323,546, filed May 25, 2023, Dennis George Thompson.

(Continued)

*Primary Examiner* — Joseph A Dillon, Jr.
(74) *Attorney, Agent, or Firm* — Rebecca Henkel; Peter K. Zacharias; Rickard K. DeMille

(57) ABSTRACT

An air flow control system for an agricultural system includes a controller configured to receive an agricultural product signal indicative of an agricultural product disposed within a storage tank of the agricultural system. The storage tank is configured to provide the agricultural product to a metering system of the agricultural system, and the metering system is configured to control an agricultural product flow rate of the agricultural product into a primary line of the agricultural system. The controller is also configured to select a selected flow rate relationship from a set of flow rate relationships based on the agricultural product disposed within the storage tank. Furthermore, the controller is configured to determine a target air flow rate of an air flow through the primary line based on the selected flow rate relationship and the agricultural product flow rate, and the controller is configured to control an air source.

20 Claims, 5 Drawing Sheets

(56) References Cited

U.S. PATENT DOCUMENTS

| | | | |
|---|---|---|---|
| 9,615,506 B2 | 4/2017 | Ruppert et al. | |
| 9,739,654 B2 | 8/2017 | Binsirawanich et al. | |
| 9,788,475 B2 | 10/2017 | Henry | |
| 9,989,393 B2 | 6/2018 | Hossain et al. | |
| 10,791,727 B2 | 10/2020 | Roberge et al. | |
| 10,820,483 B2 | 11/2020 | Gervais et al. | |
| 10,820,484 B2 | 11/2020 | Gervais et al. | |
| 10,820,486 B2 | 11/2020 | Gervais et al. | |
| 10,918,010 B2 | 2/2021 | Gervais et al. | |
| 11,317,558 B2 * | 5/2022 | Chahley | G06F 21/575 |
| 11,432,456 B2 | 9/2022 | Donadon et al. | |
| 12,075,720 B2 * | 9/2024 | Ryder | A01C 15/006 |
| 12,116,222 B2 * | 10/2024 | Thompson | A01C 7/102 |
| 2016/0128270 A1 * | 5/2016 | Ruppert | A01C 15/04 701/50 |
| 2020/0026884 A1 * | 1/2020 | Chahley | G06F 21/575 |
| 2021/0007272 A1 | 1/2021 | Schoeny et al. | |
| 2021/0372441 A1 | 12/2021 | Kale et al. | |
| 2021/0386009 A1 | 12/2021 | Engel et al. | |
| 2022/0279705 A1 | 9/2022 | Plattner | |
| 2022/0279706 A1 | 9/2022 | Boufleur et al. | |
| 2023/0039311 A1 | 2/2023 | Thompson | |
| 2024/0206372 A1 * | 6/2024 | da Silva | A01C 7/105 |
| 2024/0389499 A1 * | 11/2024 | Thompson | A01C 7/102 |

FOREIGN PATENT DOCUMENTS

| | | |
|---|---|---|
| CA | 2803403 | 7/2013 |
| EP | 2932818 | 10/2015 |
| WO | 2021183027 | 9/2021 |
| WO | 2022191766 | 9/2022 |

OTHER PUBLICATIONS

U.S. Appl. No. 18/323,859, filed May 25, 2023, Dennis George Thompson.

\* cited by examiner

AIR FLOW CONTROL SYSTEM FOR AN AGRICULTURAL SYSTEM

BACKGROUND

The present disclosure relates generally to an air flow control system for an agricultural system.

Generally, agricultural seeding implements are towed behind a work vehicle, such as a tractor. The agricultural seeding implement may include multiple rows of ground engaging opener assemblies to excavate trenches into soil for depositing an agricultural product, such as seed or fertilizer. An air cart may be towed behind or in front of the agricultural seeding implement and configured to provide the agricultural product to the ground engaging opener assemblies. In this manner, rows of the agricultural product may be deposited into the soil.

The agricultural product may be pneumatically conveyed from the air cart to the ground engaging opener assemblies via distribution lines (e.g., primary lines, secondary lines, tertiary lines, etc.). For example, the air cart may include an air source configured to output an air flow, and multiple primary lines may extend from the air source. A metering system positioned downstream from the air source may meter the agricultural product into the primary lines, and the air flow may fluidize and convey the agricultural product toward the ground engaging opener assemblies.

Prior to performing the seeding operation, a speed of a fan of the air source may be adjusted based on the desired flow rate of the agricultural product. For example, prior to the seeding operation, the metering system may be controlled to output the agricultural product at the desired flow rate. The speed of the fan of the air source may then be adjusted until a target criterion is achieved. For example, the target criterion may include a height of a flow of the agricultural product from a distribution line pointed upwardly. The target criterion may be selected to achieve an air flow rate that reduces the possibility of plugging and reduces the impact of the agricultural product onto the soil. Unfortunately, performing the fan speed adjustment process prior to the seeding operation is time consuming, thereby reducing the efficiency of the seeding operation. In addition, because the fan speed is typically fixed during the seeding operation, as the flow rate of the agricultural product changes, the air flow rate may be too high or too low for the agricultural product flow rate, thereby undesirably increasing the impact of the agricultural product onto the soil or increasing the possibility of plugging, respectively.

BRIEF DESCRIPTION

In certain embodiments, an air flow control system for an agricultural system includes a controller having a memory and a processor. The controller is configured to receive an agricultural product signal indicative of an agricultural product disposed within a storage tank of the agricultural system. The storage tank is configured to provide the agricultural product to a metering system of the agricultural system, and the metering system is configured to control an agricultural product flow rate of the agricultural product into a primary line of the agricultural system. The controller is also configured to select a selected flow rate relationship from a set of flow rate relationships based on the agricultural product disposed within the storage tank. Each flow rate relationship of the set of flow rate relationships includes a set of input agricultural product flow rates and a corresponding set of output air flow rates for a respective input agricultural product. Furthermore, the controller is configured to determine a target air flow rate of an air flow through the primary line based on the selected flow rate relationship and the agricultural product flow rate, and the controller is configured to control an air source to establish an air flow rate of the air flow through the primary line within a threshold range of the target air flow rate.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
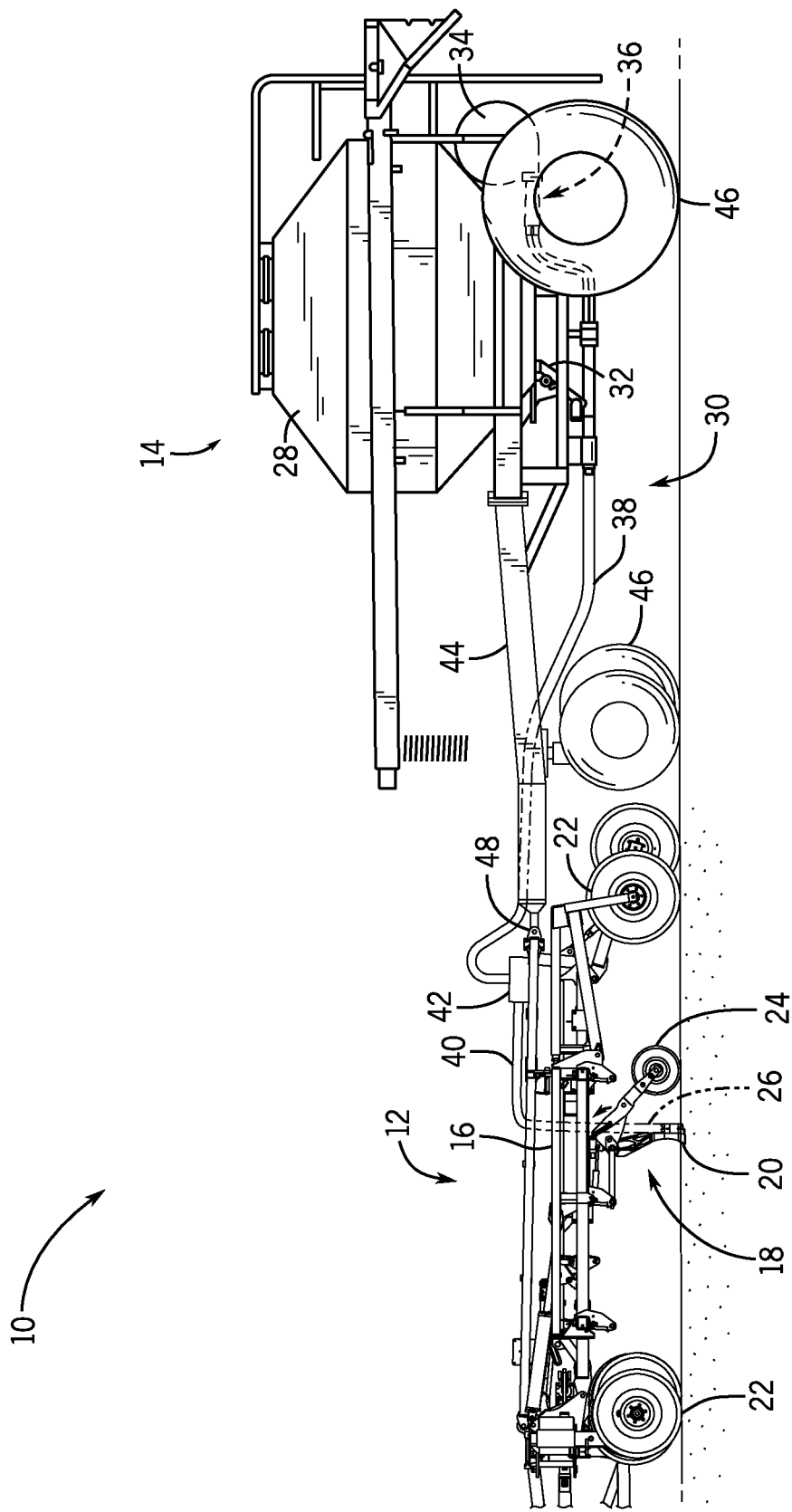
FIG. 1 is a side view of an embodiment of an agricultural system having an agricultural seeding implement and an air cart.

FIG. 1 is a side view of an embodiment of an agricultural system 10 having an agricultural seeding implement 12 and an air cart 14. In the illustrated embodiment, the agricultural seeding implement 12 includes a tool frame 16, and a row unit 18, which includes an opener 20, is coupled to the tool frame 16. As illustrated, wheel assemblies 22 are also coupled to the tool frame 16. The agricultural seeding implement 12 may be pulled through a field by a work vehicle (e.g., a tractor), and the agricultural seeding implement 12 may deposit rows of agricultural product (e.g., seed, fertilizer, inoculant, etc.) into the soil as the agricultural seeding implement 12 traverses the field. The wheel assemblies 22 contact the soil surface and enable the agricultural seeding implement 12 to be pulled by the work vehicle, and the row unit 18 may deposit one row of the agricultural product into the soil. Although only one row unit 18 is shown coupled to the tool frame 16 for clarity, the agricultural seeding implement 12 may include multiple row units 18 (e.g., organized in one or more rows across the agricultural seeding implement 12). In some embodiments, the agricultural seeding implement 12 may include 12, 14, 16, 18, 20, or more row units 18, each of which may deposit agricultural product into the soil to form a respective row.

To facilitate depositing the agricultural product within the soil, each row unit 18 includes the opener 20, a press wheel 24, and at least one agricultural product tube 26. In response to movement of the row unit 18 through the field, the opener 20 exerts a force onto the soil that excavates a trench within the soil. As the agricultural seeding implement 12 moves through the field, the row unit 18 may deposit the agricultural product into the excavated trench via the agricultural product tube(s) 26. Then, the press wheel 24 may pack soil onto the deposited agricultural product.

In the illustrated embodiment, the air cart 14 includes at least one storage tank 28 configured to centrally store the agricultural product. In addition, the agricultural system 10 includes distribution lines 30 configured to facilitate flow of the agricultural product to the row units 18. Furthermore, the air cart 14 includes a metering system 32 configured to control flow of the agricultural product into the distribution lines 30. The air cart 14 also includes an air source 34 configured to provide an air flow through the distribution lines 30. The air flow interacts with the agricultural product flowing into the distribution lines 30 from the metering system 32, thereby fluidizing the agricultural product and forming an air/agricultural product mixture. The distribution lines 30 are configured to transport the air/agricultural product mixture to the row units 18, thereby providing the row units 18 with a metered flow of the agricultural product.

In the illustrated embodiment, the air cart 14 includes a plenum 36 coupled to the air source 34. The plenum 36 is configured to distribute the air flow provided by the air source 34 across multiple primary lines 38 of the distribution lines 30. The metering system 32 controls the flow of the agricultural product into the primary lines 38, and the air flow through the primary lines 38 fluidizes the agricultural product and conveys the agricultural product toward the row units 18. In addition, the distribution lines 30 include secondary lines 40 coupled to each primary line 38 via a respective distribution header 42. Each distribution header 42 is configured to distribute the air/agricultural product mixture provided by a respective primary line 38 to multiple secondary lines 40. In the illustrated embodiment, each secondary line 40 is coupled to a respective row unit 18. Accordingly, the agricultural product is conveyed from a storage tank 28 to the row units 18 via the primary lines 38, the distribution headers 42, and the secondary lines 40. However, in other embodiments, the agricultural system may include a secondary distribution header coupled to each secondary line, and multiple tertiary lines may be coupled to each secondary distribution header. In such embodiments, each tertiary line may be coupled to a respective row unit, such that the agricultural product is distributed via the primary lines, primary distribution headers, secondary lines, secondary distribution headers, and tertiary lines. Furthermore, in certain embodiments, the secondary lines and the distribution headers may be omitted, and the primary lines may be directly coupled to respective row units.

In the illustrated embodiment, the air cart 14 includes a frame 44 configured to support the storage tank(s) 28, the metering system 32, the air source 34, and the plenum 36. The air cart 14 also includes wheels 46 rotatably coupled to the frame 44 and configured to facilitate movement of the air cart 14 through the field. In the illustrated embodiment, the air cart 14 is towed behind the agricultural seeding implement 12. Accordingly, the agricultural seeding implement 12 is coupled to the work vehicle by a first hitch assembly, and the air cart 14 is coupled to the agricultural seeding implement 12 by a second hitch assembly 48. However, in other embodiments, the agricultural seeding implement may be towed behind the air cart. In further embodiments, the agricultural seeding implement and the air cart may be part of a single unit that is towed behind a work vehicle, or the agricultural seeding implement and the air cart may be elements of a self-propelled vehicle.

In certain embodiments, the agricultural system 10 includes an air flow control system having a controller. The controller is configured to receive an agricultural product signal indicative of the agricultural product disposed within a storage tank 28 of the agricultural system 10. The storage tank 28 is configured to provide the agricultural product to the metering system 32, and the metering system 32 is configured to control an agricultural product flow rate of the agricultural product into a primary line 38. Furthermore, the controller is configured to select a selected flow rate relationship from a set of flow rate relationships based on the agricultural product disposed within the storage tank 28. Each flow rate relationship includes a set of input agricultural product flow rates and a corresponding set of output air flow rates for a respective input agricultural product. In addition, the controller is configured to determine a target air flow rate (e.g., mass air flow rate) of the air flow through the primary line 38 based on the selected flow rate relationship and the agricultural product flow rate. The controller is also configured to control the air source 34 to establish an air flow rate of the air flow through the primary line 38 within a threshold range of the target air flow rate. Accordingly, the air flow rate of the air flow through the primary line 38 may be controlled based on the agricultural product within the storage tank 28 and the agricultural product flow rate, thereby establishing an air flow rate that substantially reduces the possibility of plugging and reduces the impact of the agricultural product onto the soil. As a result, the efficiency of the seeding operation may be enhanced. In addition, because the set of flow rate relationships may be stored within a memory of the controller, the process of manually adjusting a fan speed of the air source to achieve a target criterion prior to the seeding operation may be obviated, thereby further increasing the efficiency of the seeding operation.

Figure 2:
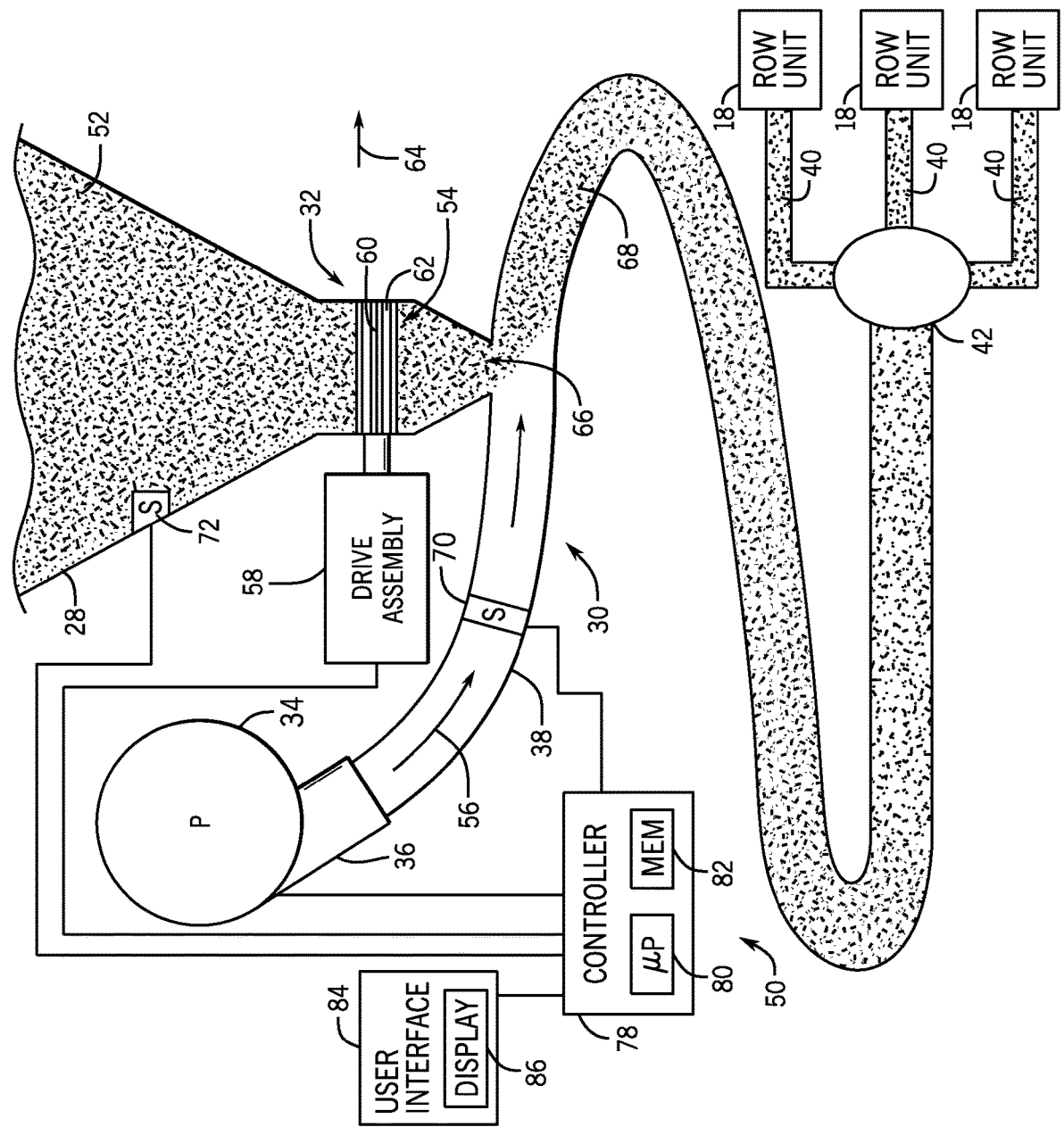
FIG. 2 is a schematic diagram of an embodiment of an air flow control system that may be employed within the agricultural system of FIG. 1.

FIG. 2 is a schematic diagram of an embodiment of an air flow control system 50 that may be employed within the air cart of FIG. 1. As previously discussed, the air source 34 is coupled to a primary line 38 of the distribution lines 30 via the plenum 36. The air source 34 may include fan(s), pump(s), blower(s), or a combination thereof, driven by suitable motor(s), such as electric motor(s), hydraulic motor(s), pneumatic motor(s), etc. Flowable agricultural product 52 (e.g., seed, fertilizer, etc.) within a storage tank 28 flows under the influence of gravity into the metering system 32. In certain embodiments, the storage tank 28 is pressurized such that a static pressure in the storage tank 28 is greater than a static pressure in the primary line 38, thereby facilitating an even flow of the agricultural product through the metering system 32. However, in other embodiments, the storage tank may be unpressurized. The metering system 32 includes one or more meter rollers 54 configured to control the flow of the agricultural product 52 into the air flow 56 output by the air source 34. In certain embodiments, the metering system 32 may include multiple meter rollers 54 (e.g., housed within individual meter boxes) disposed adjacent to one another. For example, certain metering systems may include twelve meter rollers, each housed within an individual meter box and each configured to control flow of the agricultural product into a respective primary line 38 for distribution to one or more respective row units of the agricultural seeding implement. In further embodiments, the metering system may include more or fewer meter rollers, e.g., 1, 2, 3, 4, 5, 6, 7, 8, 9, 10, 11, 13, or more. By independently adjusting the rotation speed of each meter roller, flow of the particulate material to different portions of the agricultural seeding implement may be particularly controlled.

In the illustrated embodiment, the meter roller 54 is coupled to a drive assembly 58 of the metering system 32, and the drive assembly 58 is configured to drive the meter roller 54 to rotate. In certain embodiments, the drive assembly 58 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. In further embodiments, the drive assembly may be coupled to a wheel (e.g., via a gear assembly) such that rotation of the wheel drives the meter roller to rotate. Such a configuration automatically varies the rotation rate of the meter roller based on the ground speed of the air cart.

In the illustrated embodiment, the meter roller 54 includes multiple flutes 60 and corresponding recesses 62, in which the flutes and corresponding recesses are configured to meter the flowable agricultural product via rotation of the meter roller 54. As illustrated, each recess 62 is disposed between a respective pair of flutes 60. As the meter roller 54 rotates, the respective pair of flutes 60 moves the flowable agricultural product 52 disposed within the respective recess 62 downwardly, thereby transferring the flowable agricultural product 52 to the primary line 38. The number and geometry of the flutes may be particularly configured to accommodate the agricultural product being distributed. Certain meter rollers may include six flutes and a corresponding number of recesses. Other meter rollers may include more or fewer flutes and/or recesses. For example, the meter roller may include 1, 2, 3, 4, 5, 6, 7, 8, 9, 10, 11, 12, 13, 14, 15, 16, 17, 18, 19, 20, or more flutes and/or recesses. In addition, the depth of the recesses and/or the height of the flutes may be configured to accommodate the agricultural product metered by the meter roller 54. For example, a meter roller having deeper recesses and fewer flutes may be employed for larger seeds, while a meter roller having shallower recesses and more flutes may be employed for smaller seeds. Other parameters, such as flute pitch (i.e., angle of the flute relative to a longitudinal/rotational axis of the meter roller) and flute angle (i.e., angle of the flute relative to a radial axis of the meter roller), may also be particularly selected to accommodate the flowable agricultural product.

In the illustrated embodiment, the rotational axis of the meter roller 54 is oriented substantially parallel to a direction of travel 64 of the air cart. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 64). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration/profile, the rotation rate of the meter roller 54 controls the flow of the agricultural product 52 into the air flow 56. For example, as the meter roller 54 rotates, the meter roller transfers the agricultural product through an opening 66 in the metering system 32 into the primary line 38. The agricultural product then mixes with air from the air source 34, thereby forming an air/agricultural product mixture 68. The mixture then flows to the respective row unit(s) 18 of the agricultural seeding implement, where the flowable agricultural product (e.g., seed and/or fertilizer) is deposited within the soil.

Different agricultural products may include particles of different sizes. For example, seeds, such as sunflower seeds, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of agricultural product being dispensed. For example, the target flow rate of certain seeds or fertilizers may be higher than the target flow rate of other seeds or fertilizers. Accordingly, certain embodiments of the metering system disclosed herein may facilitate removal and replacement of meter rollers, thereby enabling an operator to select a meter roller suitable for a particular flowable agricultural product and for a target dispensing rate (e.g., a target rate for particular field conditions, climate, expected yield, etc.).

In the illustrated embodiment, the primary line 38 is coupled to a distribution header 42, and three secondary lines 40 extend from the distribution header 42 to three respective row units 18. Accordingly, the primary line 38, the distribution header 42, and the secondary lines 40 direct the air/agricultural product mixture 68 to the row units 18. While the distribution lines 30 include three secondary lines 40 in the illustrated embodiment, in other embodiments, the distribution lines may include more or fewer secondary lines extending from the distribution header to respective row units. Furthermore, in certain embodiments, a secondary distribution header may be coupled to at least one secondary line, and tertiary lines may extend from the secondary distribution header to respective row units. In addition, in certain embodiments, the distribution header and the secondary lines may be omitted. In such embodiments, the primary line may extend directly to a respective row unit.

In the illustrated embodiment, the air flow control system 50 includes an air flow sensor 70. The air flow sensor 70 is positioned along the primary line 38 between the plenum 36 and the metering system 32, and the air flow sensor 70 is configured to output an air flow signal indicative of an air flow rate of the air flow 56 through the primary line 38. As used herein, "air flow rate" refers to a mass air flow rate, a volumetric air flow rate, an air speed, or another suitable air flow rate. In certain embodiments, the air flow sensor 70 includes an orifice plate having an aperture with a smaller diameter than the primary line 38. As the air flow 56 passes through the aperture, the air pressure decreases and the air velocity increases. By measuring the pressure difference between the air flow upstream and downstream of the aperture, the air flow rate (e.g., volumetric air flow rate, mass air flow rate, etc.) of air flow 56 may be determined. Furthermore, in certain embodiments, the air flow sensor 70 includes a hot wire sensor having an electrically heated element extending through the air flow 56. Heat transfer from the wire to the air flow is at least partially dependent on the air flow rate of the air flow across the wire. Therefore, by measuring the electrical current sufficient to heat the wire to a desired temperature, the air flow rate of the air flow 56 may be determined. In addition, in certain embodiments, the air flow sensor 70 includes a pitot tube configured to measure both static and dynamic air pressures within the primary line 38. By comparing the static and dynamic air pressures, the air flow rate of the air flow 56 may be determined. If a volumetric air flow rate is measured, the mass air flow rate may be determined based on the density of the air. While an orifice plate, a hot wire, and a pitot tube are disclosed above, in certain embodiments, the air flow sensor may include other suitable air flow sensing device(s) configured to monitor the air flow rate of the air flow through the primary line.

In the illustrated embodiment, the air flow control system 50 includes an agricultural product sensor 72. The agricultural product sensor 72 is configured to monitor the agricultural product 52 within the storage tank 28 and to output an agricultural product signal indicative of the agricultural product 52 within the storage tank 28. For example, the agricultural product sensor 72 may be configured to monitor one or more properties of each particle of the agricultural product 52, such as size, color, shape, density, etc., thereby facilitating determination of the agricultural product 52 within the storage tank 28. In certain embodiments, the agricultural product sensor 72 may include a camera configured to output visual information indicative of the property or properties of each particle of the agricultural product 52 (e.g., size, shape, color, etc.). Furthermore, in certain embodiments, the agricultural product sensor 72 may include inductive sensor(s), passive infrared sensor(s), active infrared sensor(s), capacitive sensor(s), microwave sensor(s), millimeter wave sensor(s), radar sensor(s), LIDAR sensor(s), other suitable type(s) of sensor(s), or a combination thereof.

Furthermore, in the illustrated embodiment, the air flow control system 50 includes a controller 78 communicatively coupled to the air flow sensor 70 and to the agricultural product sensor 72. In certain embodiments, the controller 78 is an electronic controller having electrical circuitry configured to receive the air flow signal from the air flow sensor 70 and the agricultural product signal from the agricultural product sensor 72. In the illustrated embodiment, the controller 78 includes a processor, such as the illustrated microprocessor 80, and a memory device 82. The controller 78 may also include one or more storage devices and/or other suitable components. The processor 80 may be used to execute software, such as software for controlling the air source 34, and so forth. Moreover, the processor 80 may include multiple microprocessors, one or more "general-purpose" microprocessors, one or more special-purpose microprocessors, and/or one or more application specific integrated circuits (ASICs), or some combination thereof. For example, the processor 80 may include one or more reduced instruction set (RISC) processors.

The memory device 82 may include a volatile memory, such as random access memory (RAM), and/or a nonvolatile memory, such as read-only memory (ROM). The memory device 82 may store a variety of information and may be used for various purposes. For example, the memory device 82 may store processor-executable instructions (e.g., firmware or software) for the processor 80 to execute, such as instructions for controlling the air source 34, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the air source 34, etc.), and any other suitable data. The controller may be positioned at any suitable location(s) on the agricultural system (e.g., on the air cart and/or on the agricultural seeding implement) and/or on the work vehicle coupled to the agricultural system (e.g., as one element in one location or as multiple elements in multiple locations).

In the illustrated embodiment, the air flow control system 50 includes a user interface 84 communicatively coupled to the controller 78. The user interface 84 is configured to receive input from an operator and to provide information to the operator. The user interface 84 may include any suitable input device(s) for receiving input, such as a keyboard, a mouse, button(s), switch(es), knob(s), other suitable input device(s), or a combination thereof. In addition, the user interface 84 may include any suitable output device(s) for presenting information to the operator, such as speaker(s), indicator light(s), other suitable output device(s), or a combination thereof. In the illustrated embodiment, the user interface 84 includes a display 86 configured to present visual information to the operator. In certain embodiments, the display 86 may include a touchscreen interface configured to receive input from the operator.

In the illustrated embodiment, the controller 78 is configured to receive the agricultural product signal indicative of the agricultural product 52 within the storage tank 28. As previously discussed, the storage tank 28 is configured to provide the agricultural product 52 to the metering system 32, and the metering system 32 is configured to control an agricultural product flow rate of the agricultural product into the primary line 38. In certain embodiments, the controller 78 is configured to receive the agricultural product signal from the agricultural product sensor 72. As previously discussed, in certain embodiments, the agricultural product sensor 72 monitors one or more properties of each particle of the agricultural product 52. In such embodiments, the agricultural product signal may include data indicative of the property or properties. The controller 78 may receive the agricultural product signal and determine the agricultural product 52 within the storage tank 28 based on the property or properties. For example, the controller may identify the agricultural product 52 as sunflower seeds, pea seeds, wheat seeds, granular microbial soil inoculant, monoammonium phosphate (MAP), etc. based on the property or properties. Additionally or alternatively, the controller 78 is configured to receive the agricultural product signal from the user interface 84. For example, the user may input the agricultural product 52 into the user interface 84, and the user interface, in turn, may output the agricultural product signal indicative of the agricultural product to the controller 78. In certain embodiments, the controller 78 may determine the agricultural product in response to receiving the agricultural product signal from the agricultural product sensor 72, control the user interface 84 (e.g., the display 86 of the user interface 84) to present the determined agricultural product to the operator, and enable the operator to override the determined agricultural product via input to the user interface 84. In embodiments in which the controller is configured to receive the agricultural product signal from the user interface, the agricultural product sensor may be omitted.

Furthermore, the controller 78 is configured to select a selected flow rate relationship from a set of flow rate relationships based on the agricultural product 52 disposed within the storage tank 28. Each flow rate relationship of the set of flow rate relationships includes a set of input agricultural product flow rates and a corresponding set of output air flow rates for a respective input agricultural product. For example, the set of flow rate relationships may be stored within the memory 82 of the controller 78, and each flow rate relationship is associated with a respective input agricultural product, such as the sunflower seeds, pea seeds, wheat seeds, granular microbial soil inoculant, and monoammonium phosphate (MAP) disclosed above. The controller 78 may select the selected flow rate relationship by matching the agricultural product 52 disposed within the storage tank 28 to the input agricultural product of the selected flow rate relationship. If the controller 78 is unable to match the agricultural product 52 disposed within the storage tank 28 to any input agricultural product of the set of flow rate relationships, the controller 78 may control the user interface 84 to present a notification to the operator indicating that the set of flow rate relationships does not include a flow rate relationship corresponding to the agricultural product 52 disposed within the storage tank 28.

As previously discussed, each flow rate relationship of the set of flow rate relationships includes a set of input agricultural product flow rates and a corresponding set of output air flow rates for a respective input agricultural product. The set of input agricultural product flow rates and the corresponding set of output air flow rates may be stored in any suitable format, such as a table, a polynomial curve (e.g., quadratic curve, cubic curve, etc.), a spline (e.g., cubic spline, etc.), etc. As discussed in detail below, in certain embodiments, the controller 78 is configured to determine at least one flow rate relationship of the set of flow rate relationships via a calibration process. Additionally or alternatively, the controller 78 may receive at least one flow rate relationship from an external source, such as a remote server, a memory card, a computer disc, etc.

After the selected flow rate relationship is selected from the set of flow rate relationships, the controller 78 determines a target air flow rate (e.g., mass air flow rate, etc.) of the air flow 56 through the primary line 38 based on the selected flow rate relationship and the agricultural product flow rate. For example, the controller 78 may use the selected flow rate relationship to identify the output air flow rate corresponding to the agricultural product flow rate. The controller 78 may then set the target air flow rate to the identified output air flow rate.

In certain embodiments, the controller 78 is configured to determine the agricultural product flow rate based on the rotation rate of the meter roller 54. For example, as previously discussed, for a particular meter roller configuration/profile, the rotation rate of the meter roller 54 controls the agricultural product flow rate of the agricultural product 52 into the air flow 56. In the illustrated embodiment, the controller 78 is communicatively coupled to the drive assembly 58. In certain embodiments, the controller 78 receives feedback from the drive assembly 58 (e.g., from sensor(s) of the drive assembly) indicative of the rotation rate of the meter roller 54. Furthermore, in certain embodiments, the controller 78 may control the drive assembly 58 to drive the meter roller 54 to rotate at the rotation rate. The controller 78 may determine the agricultural product flow rate based on the rotation rate of the meter roller 54 and the configuration/profile of the meter roller 54 (e.g., which may be stored in the memory 82 of the controller 78). For example, the configuration/profile of the meter roller 54 may include information indicative of the amount of agricultural product output by the meter roller 54 per rotation of the meter roller 54 (e.g., which may be determined via a meter roller calibration process).

Furthermore, in certain embodiments, the controller 78 is configured to determine the agricultural product flow rate based at least in part on an agricultural product prescription, a ground speed of the agricultural system, and a lateral extent of the row units 18 configured to receive the agricultural product from the primary line 38. The agricultural product prescription may include a target amount (e.g., weight) of agricultural product per area of the field (e.g., lbs./acre, kg/hectare, etc.). The agricultural product prescription may be part of an agricultural product prescription map of the field, in which the agricultural product prescription varies throughout the field. Accordingly, the controller 78 may determine the agricultural product prescription based on the agricultural product prescription map and the position of the agricultural seeding implement within the field. Additionally or alternatively, the agricultural product prescription may be manually entered into the user interface, and the user interface may output a signal to the controller indicative of the agricultural product prescription. Furthermore, the controller 78 is configured to determine an area rate (e.g., acres/min, hectares/min, etc.) based on the lateral extent of the row units 18 configured to receive the agricultural product from the primary line 38 and the ground speed of the agricultural system. The controller 78 is also configured to determine the agricultural product flow rate based on the agricultural product prescription and the area rate (e.g., by multiplying the agricultural product prescription by the area rate).

After determining the target air flow rate, the controller 78 controls the air source 34 to establish an air flow rate of the air flow 56 through the primary line 38 within a threshold range of the target air flow rate. In the illustrated embodiment, the controller 78 is communicatively coupled to the air source 34 and configured to control the air source 34. For example, to control the air flow rate of the air flow output by the air source 34 through the primary line 38, the controller 78 may control a rotation speed and/or a blade angle of a fan of the air source 34. Furthermore, the threshold range may include a range of air flow rates or a percentage of the target air flow rate. For example, the threshold range may include a lower threshold of 0.5 percent, 1 percent, 2 percent, 3 percent, 4 percent, or 5 percent of the target air flow rate, and the threshold range may include an upper threshold of 0.5 percent, 1 percent, 2 percent, 3 percent, 4 percent, or 5 percent of the target air flow rate. The steps of determining the target air flow rate and controlling the air source may be iteratively repeated during operation of the agricultural system. For example, the steps of determining the target air flow rate and controlling the air source may be iteratively repeated at a suitable interval (e.g., 0.5 seconds, 1 second, 2 seconds, 5 seconds, 10 seconds, 30 seconds, 60 seconds, etc.).

As previously discussed, the air flow sensor 70 is configured to output an air flow signal indicative of the air flow rate (e.g., mass air flow rate, etc.) of the air flow 56 through the primary line 38. In the illustrated embodiment, the air flow sensor 70 is communicatively coupled to the controller 78 and configured to output the air flow signal to the controller 78. The controller 78 is configured to control the air source 34 to establish the air flow rate through the primary line 38 within the threshold range of the target air flow rate based on feedback from the air flow sensor 70, thereby providing closed loop control of the air source 34. For example, the controller 78 may determine the air flow rate based on feedback from the air flow sensor 70 and compare the determined air flow rate to the target air flow rate to facilitate control of the air source 34. While the air flow control system 50 includes one air flow sensor 70 in the illustrated embodiment, in other embodiments, the air flow control system may include more or fewer air flow sensors (e.g., 0, 2, 3, 4, or more). For example, in certain embodiments, the air flow sensor may be omitted. In such embodiments, the controller 78 may control the air source 34 via an open loop control process. Furthermore, while controlling the air source to establish an air flow rate within a threshold range of a target air flow rate is disclosed herein, in certain embodiments, the air source may be controlled to establish the air flow rate based on the target air flow rate via other suitable techniques (e.g., controlling the air source such that the air flow rate is above the target air flow rate, controlling the air source such that the air flow rate is below the target air flow rate, etc.).

In embodiments in which the air flow control system 50 includes at least one air flow sensor 70, the controller 78 may provide closed loop control of the air source 34 via any suitable type of control logic, such as fuzzy control logic or proportional-integral-derivative (PID) control logic. For example, in certain embodiments, the controller 78 may control the air source 34 using fuzzy control logic. In such embodiments, the controller 78 may map inputs, including the air flow rate (e.g., as determined based on feedback from the air flow sensor 70) and the target air flow rate, to values between 0 and 1 (e.g., a "fuzzy" set) using membership functions (e.g., singleton membership functions, triangular membership functions, and so forth). The controller 78 may then use an inference engine with an associated set of decision-making rules (e.g., including the threshold range) to generate a fuzzy output set. The controller 78 may convert the fuzzy output set to an air source control signal and output the air source control signal to the air source 34, thereby controlling the air source 34. The air source control signal may be indicative of instructions to change a rotation speed and/or a blade angle of a fan of the air source 34 by a respective increment, in which each increment is based on the fuzzy output set.

Furthermore, in certain embodiments, the controller 78 may control the air source 34 using PID control logic. In such embodiments, the controller 78 may determine an error value based on the difference between the air flow rate (e.g., as determined based on feedback from the air flow sensor 70) and the target air flow rate. The controller may also determine a proportional term that is directly proportional to the error value at a selected time. Furthermore, the controller 78 may determine an integral term based on a cumulative error between the air flow rate and the target air flow rate over a period of time. The controller 78 may also determine a derivative term based on a rate of change of the error value. The controller may then determine increment(s) for adjusting a rotation speed and/or a blade angle of a fan of the air source 34 by adjusting the proportional term, the integral term, and the derivative term of a PID equation via a PID algorithm to reduce (e.g., substantially minimize) the output of the PID equation. The controller 78 may output an air source control signal indicative of the increment(s) to the air source 34, thereby controlling the air source. In some embodiments, parameters of the PID equation may be manually tuned via input from the user interface 84. While fuzzy control logic and PID control logic are disclosed above, in certain embodiments, the controller 78 may provide closed loop control of the air source 34 via any other suitable type of control logic.

In certain embodiments, the controller 78 is configured to increase the target air flow rate in response to the agricultural product flow rate decreasing below a threshold value. For example, during a headland turn and/or while repositioning the agricultural system, the controller 78 may control the drive assembly 58 to set the agricultural product flow rate to zero, such that the agricultural product is not deposited within the soil at the headland/along the repositioning path. The selected flow rate relationship may include a zero or very low output air flow rate for an input agricultural product flow rate of zero (e.g., based on the table, polynomial curve fit, spline, etc., which represents the flow rate relationship). However, reducing the air flow rate to zero or a very low value may delay the process of increasing the air flow rate at the end of the headland turn/repositioning maneuver due to the time associated with increasing the speed of the fan of the air source. Accordingly, in response to the agricultural product flow rate decreasing below a threshold value (e.g., 10 percent, 5 percent, 3 percent, 2 percent, or 1 percent, of the average agricultural product flow rate, etc.), the controller 78 may increase the target air flow rate (e.g., above the output air flow rate provided by the selected flow rate relationship), thereby causing the air source 34 to output the air flow at a base flow rate. Accordingly, when the agricultural product flow rate increases (e.g., at the end of the headland turn, at the end of the repositioning maneuver), the air flow rate may increase in a shorter time period, thereby increasing the efficiency of the seeding operation.

In addition, in certain embodiments, the controller 78 is configured to apply a bias to the selected flow rate relationship to increase or decrease each of the plurality of output air flow rates (e.g., by a fixed amount, by a fixed percentage, etc.). For example, during the seeding operation, the operator or the controller may detect a plugging condition or an impending plugging condition. The plugging condition may occur when the agricultural product builds up within the primary line 38, the distribution header 42, within one or more secondary lines 40, or a combination thereof, and interferes with the flow of the air/agricultural product mixture 68 to one or more row units 18. Accordingly, in response to the operator detecting the plugging condition or the impending plugging condition, the operator may provide an input to the user interface 84, and the user interface 84, in turn, may output a signal to the controller 78 to apply the bias to the selected flow rate relationship. Additionally or alternatively, in response to the controller detecting the plugging condition or the impending plugging condition (e.g., based on input from one or more sensors), the controller 78 may apply the bias to the selected flow rate relationship. The bias increases each of the output air flow rates (e.g., by shifting a curve/spline representing the selected flow rate relationship upwardly), thereby increasing the target air flow rate (e.g., in response to the target air flow rate being set to the identified output air flow rate). As previously discussed, the controller 78 controls the air source 34 to establish an air flow rate of the air flow 56 through the primary line 38 within a threshold range of the target air flow rate. Accordingly, increasing the target air flow rate increases the air flow rate through the primary line, thereby reducing/terminating the plugging condition (e.g., by breaking up the buildup of the agricultural product) or reducing the possibility of the impending plugging condition becoming a plugging condition. In certain embodiments, the operator may instruct the controller, via the user interface, to terminate the bias in response to termination of the plugging condition/impending plugging condition. Additionally or alternatively, the controller may automatically terminate the bias in response to termination of the plugging condition/impending plugging condition.

By way of further example, during the seeding operation, the operator or the controller may detect high agricultural product output speeds (e.g., resulting in high impact forces between the agricultural product and the soil and/or reduction in placement accuracy of the particles of the agricultural product relative to the trench formed in the soil). For example, in response to the operator detecting particles of the agricultural product positioned outside of the trench, the operator may provide an input to the user interface 84, and the user interface 84, in turn, may output a signal to the controller 78 to apply the bias to the selected flow rate relationship. Additionally or alternatively, in response to the controller detecting particles of the agricultural product positioned outside of the trench (e.g., based on input from one or more sensors), the controller 78 may apply the bias to the selected flow rate relationship. The bias decreases each of the output air flow rates (e.g., by shifting a curve/spline representing the selected flow rate relationship downwardly), thereby decreasing the target air flow rate (e.g., in response to the target air flow rate being set to the identified output air flow rate). As previously discussed, the controller 78 controls the air source 34 to establish an air flow rate of the air flow 56 through the primary line 38 within a threshold range of the target air flow rate. Accordingly, decreasing the target air flow rate decreases the air flow rate through the primary line, thereby reducing agricultural product output speeds, which reduces the impact forces between the agricultural product and the soil and/or increases the placement accuracy of the particles of the agricultural product relative to the trench formed in the soil. In certain embodiments, the operator may instruct the controller, via the user interface, to terminate the bias, and/or the controller may automatically terminate the bias. While applying the bias in response to a plugging condition/impending plugging condition and in response to high agricultural product output speeds is disclosed above, in certain embodiments, the bias may be applied in response to other conditions/operational states. Furthermore, in certain embodiments, the bias may increase or decrease each output air flow rate by a fixed amount or a fixed percentage (e.g., 1 percent, 2 percent, 3 percent, 4 percent, 5 percent, etc.). For example, the amount/percentage may be input into the user interface and/or determined by the controller (e.g., based on monitored pressure(s) within one or more distribution lines, the air flow rate, the agricultural product flow rate, etc.).

Furthermore, in certain embodiments, the controller 78 is configured to update at least one flow rate relationship (e.g., the selected flow rate relationship) of the set of flow rate relationships using machine learning based on operation of the agricultural system within the field. In certain embodiments, the controller 78 may train the machine learning process based on application of the bias to the selected flow rate relationship. For example, in response to each instance in which the bias is applied, the controller may store the bias value and/or the modified flow rate relationship. The bias values/modified flow rate relationships may be used to train the machine learning process, thereby enabling the controller to establish an updated flow rate relationship that may reduce the number of instances that the bias is applied during the seeding operation. Furthermore, in certain embodiments, the controller 78 may train the machine learning process based on detection of plugging conditions/impending plugging conditions and/or detection of high agricultural product output speeds (e.g., resulting in high impact forces between the agricultural product and the soil and/or reduction in placement accuracy of the particles of the agricultural product relative to the trench formed in the soil). For example, in response to each instance in which the plugging condition/impending plugging condition/high agricultural product output speeds is detected, the controller may store data associated with the condition. The data may be used to train the machine learning process, thereby enabling the controller to establish an updated flow rate relationship that may reduce the number of instances in which the plugging condition/impending plugging condition/high agricultural product output speeds is detected. While training the machine learning process based on application of the bias and detection of plugging conditions/impending plugging conditions/high agricultural product output speeds is disclosed above, the machine learning process may be trained using other suitable data. The machine learning process may be trained based on data from the agricultural system and/or other agricultural system(s). Furthermore, the machine learning process may be trained while the agricultural system/other agricultural system(s) are operating in the same environmental conditions (e.g., air temperature, air pressure, etc.) and/or using the same system configuration (e.g., number of row units, primary line length, primary line width, length of the secondary lines, width of the secondary lines etc.). Additionally or alternatively, the machine learning process may be trained while the agricultural system/other agricultural system(s) are operating in different environmental conditions and/or using different system configurations. In certain embodiments, the machine learning process may generate an updated flow rate relationship based on the environmental conditions and/or the system configuration.

As previously discussed, in certain embodiments, the controller 78 is configured to determine at least one flow rate relationship (e.g., each flow rate relationship) of the set of flow rate relationships via a calibration process. In certain embodiments, the controller 78 may perform the calibration process after the agricultural product 52 is disposed within the storage tank 28 and prior to the seeding operation. The calibration process includes controlling the metering system 32 to output the agricultural product at a first input agricultural product flow rate of the set of input agricultural product flow rates (e.g., by controlling the drive assembly 58 to drive the meter roller 54 to rotate at a target speed) and controlling the air source 34 to adjust the air flow rate of the air flow 56 through the primary line until a target criterion is achieved, thereby establishing a first air flow value (e.g., the air flow rate of the air flow through the primary line when the target criterion is achieved). The calibration process also includes controlling the metering system 32 to output the agricultural product at a second input agricultural product flow rate of the set of input agricultural product flow rates (e.g., by controlling the drive assembly 58 to drive the meter roller 54 to rotate at a target speed) and controlling the air source 34 to adjust the air flow rate of the air flow 56 through the primary line until the target criterion is achieved, thereby establishing a second air flow value (e.g., the air flow rate of the air flow through the primary line when the target criterion is achieved). Furthermore, the calibration process includes determining the flow rate relationship based on the first input agricultural product flow rate, the first air flow value, the second input agricultural product flow rate, and the second air flow value. While the calibration process disclosed above includes two iterations for determining two air flow values, in certain embodiments, the calibration process may include additional iterations to determine additional air flow values. For example, the calibration process may include determining 3, 4, 5, 6, 7, 8, 9, 10, or more air flow values.

The target criterion may be selected to achieve an air flow rate that reduces the possibility of plugging and reduces the impact of the agricultural product onto the soil. In certain embodiments, the target criterion includes a target height of a flow of the agricultural product from a distribution line pointed upwardly. For example, one secondary line 40 may be disconnected from the respective row unit 18 and pointed upwardly. The target criterion may include a target height of the flow of the agricultural product from the upwardly pointed secondary line. In certain embodiments, the operator may manually monitor the height and provide an input to the user interface in response to the target height being achieved. The user interface, in turn, may output a signal to the controller indicating that the target criterion is achieved. Additionally or alternatively, the air flow control system may include sensor(s) (e.g., camera(s), etc.) configured to monitor the height of the agricultural product flow, thereby enabling the controller to determine when the target height is achieved. While one criterion (e.g., target height of an agricultural product flow) is disclosed above, in certain embodiments, another suitable criterion may be used during the calibration process.

In certain embodiments, the controller may determine the flow rate relationship by storing each input agricultural product flow rate set during the calibration process (e.g., the first input agricultural product flow rate, the second input agricultural product flow rate, etc.) and each air flow value determined during the calibration process (e.g., the first air flow value, the second air flow value, etc.) in a table. In such embodiments, each air flow value corresponds to a respective output air flow rate of the set of output air flow rates. Furthermore, in certain embodiments, the controller 78 may generate a curve fit through the input agricultural product flow rates set during the calibration process (e.g., the first input agricultural product flow rate, the second input agricultural product flow rate, etc.) and the air flow values determined during the calibration process (e.g., the first air flow value, the second air flow value, etc.). The curve fit may generate a polynomial curve (e.g., quadratic curve, cubic curve, etc.), a spline (e.g., cubic spline, etc.), or another suitable curve. The values of the generated curve (e.g., x-y coordinates of the generated curve) correspond to the set of input agricultural product flow rates and the corresponding set of output air flow rates of the flow rate relationship. While determining one flow rate relationship via the calibration process is disclosed above, in certain embodiments, the controller may determine multiple flow rate relationships of the set of flow rate relationships, in which each flow rate relationship is determined for a different agricultural product. Furthermore, in certain embodiments, the controller may determine one or more flow rate relationships using other suitable calibration process(es). After the calibration process is complete, the controller 78 may store the determined flow rate relationship (e.g., for use during the present seeding operation, for use during future seeding operations, etc.) and/or output the determined flow rate relationship (e.g., to a remote server, to other agricultural systems, etc.) for use by other agricultural systems.

While the process of selecting a selected flow rate relationship from a set of flow rate relationships, determining a target air flow rate based on the selected flow rate relationship and an agricultural product flow rate, and controlling an air source to establish an air flow rate within a threshold range of the target air flow rate is disclosed above with regard to one primary line, the process may be utilized for an agricultural system having multiple primary lines. For example, in certain embodiments, the agricultural system may include multiple primary lines and an air source that is not configured to independently control the air flow rate of the air flow through each primary line. In such embodiments, the air flow rate of the air flow through each primary line may be controlled concurrently by controlling the air source, as disclosed above. Furthermore, in certain embodiments, the agricultural system may include multiple primary lines and an air source that is configured to independently control the air flow rate of the air flow through each primary line (e.g., via multiple independently controllable fans, via valves, etc.). In such embodiments, the controller may select a single flow rate relationship, as disclosed above, and determine a target air flow rate for each primary line based on the single selected flow rate relationship and the agricultural product flow rate of the agricultural product into the respective primary line. For example, the metering system may include multiple independently controllable meter rollers, and each meter roller may be configured to provide the agricultural product to a respective primary line. Accordingly, the agricultural product flow rate may vary among the primary lines, and the controller may determine a respective target air flow rate for each primary line. The controller may then control the air source to establish an air flow rate of the air flow through each primary line within the threshold range of the respective target air flow rate. In certain embodiments, an air flow sensor is positioned along each primary line. In such embodiments, the controller is configured to control the air source to establish an air flow rate of the air flow through each primary line within the threshold range of the respective target air flow rate based on feedback from the respective air flow sensor, thereby providing closed loop control of the air source. In other embodiments, at least one air flow sensor may be omitted. In such embodiments, the controller may control the air source via an open loop control process for each primary line without an air flow sensor.

While selecting a single flow rate relationship for an agricultural system having multiple primary lines and an air source configured to independently control the air flow rate through each primary line is disclosed above, in certain embodiments, a respective flow rate relationship may be selected for each primary line. For example, a respective set of flow rate relationships may be associated with each primary line. The controller may select the selected flow rate relationship from the set of flow rate relationships for each primary line, such that a selected flow rate relationship is associated with each primary line. The controller may then determine the target air flow rate based on the selected flow rate relationship associated with the respective primary line and the agricultural product flow rate of the agricultural product into the respective primary line. Furthermore, the controller may control the air source as disclosed above. In certain embodiments, the controller may perform a calibration process, such as the calibration process disclosed above, for one or more primary lines to establish at least one flow rate relationship of the set of flow rate relationships for each respective primary line, and/or the controller may receive at least one flow rate relationship of the set of flow rate relationships for one or more primary lines from an external source, such as a remote server, a memory card, a computer disc, etc. Furthermore, in certain embodiments, the controller may perform a single calibration process, such as the calibration process disclosed above, for a single primary line to establish at least one flow rate relationship of the set of flow rate relationships for the single primary line, and/or the controller may receive at least one flow rate relationship of the set of flow rate relationships for the single primary line from an external source, such as a remote server, a memory card, a computer disc, etc. The controller may then adjust each flow rate relationship to suit the other primary lines. For example, the controller may adjust each flow rate relationship for the other primary lines based on the difference in primary line length, primary line width, number of secondary lines that receive the air/agricultural product mixture from the primary line, length of the secondary lines, width of the secondary lines, other suitable parameters, or a combination thereof. In certain embodiments, the controller may utilize a machine learning process to adjust each flow rate relationship for the other primary lines based on the differences between the parameters associated with the primary lines. For example, the controller may use data associated with identifying plugging conditions, identifying impending plugging conditions, identifying high impact forces between the agricultural product and the soil, other suitable monitored conditions, or a combination thereof, and the parameters associated with the primary lines to train the machine learning process. The controller may then use the machine learning process to adjust each flow rate relationship for the other primary lines based on the parameters associated with the primary lines.

Figure 3:
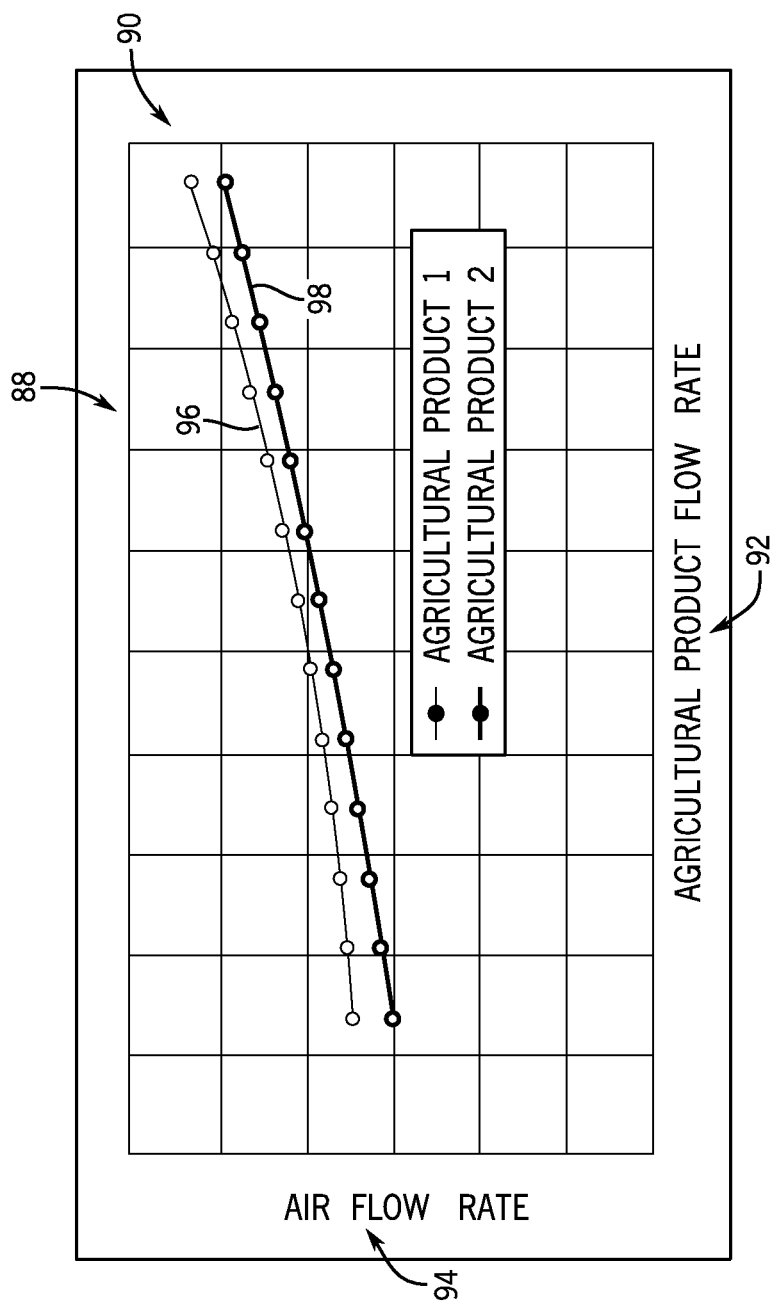
FIG. 3 is a graph of an embodiment of a set of flow rate relationships, in which each flow rate relationship includes multiple input agricultural product flow rates and multiple corresponding output air flow rates for a respective input agricultural product.

FIG. 3 is a graph 88 of an embodiment of a set of flow rate relationships 90, in which each flow rate relationship includes multiple input agricultural product flow rates and multiple corresponding output air flow rates for a respective input agricultural product. The x-axis 92 of the graph 88 corresponds to the input agricultural product flow rate, and the y-axis 94 of the graph 88 corresponds to the output air flow rate. In the illustrated embodiment, the set of flow rate relationships 90 includes a first flow rate relationship 96 and a second flow rate relationship 98. The first flow rate relationship 96 includes multiple input agricultural product flow rates and multiple corresponding output air flow rates for a first agricultural product (e.g., "agricultural product 1"), and the second flow rate relationship 98 includes multiple input agricultural product flow rates and multiple corresponding output air flow rates for a second agricultural product (e.g., "agricultural product 2"). In certain embodiments, the set of flow rate relationships may include additional flow rate relationships for other input agricultural products. The agricultural products disclosed herein may include agricultural products of different types and agricultural products of the same type having different physical properties (e.g., shape, size, etc.) of the particles. For example, in certain embodiments, the set of flow rate relationships may include one flow rate relationship for small pea seeds and another flow rate relationship for large pea seeds.

In the illustrated embodiment, each flow rate relationship is represented as a quadratic curve. However, in other embodiments, at least one flow rate relationship may be represented as any suitable type of polynomial curve (e.g., cubic curve, etc.). Furthermore, in certain embodiments, at least one flow rate relationship may be represented as a spline (e.g., cubic spline, etc.) or another suitable type of curve. In addition, in certain embodiments, at least one flow rate relationship may be represented as a table. For each flow rate relationship represented as a curve, the curve includes multiple input agricultural product flow rates and multiple corresponding output air flow rates (e.g., corresponding to x-y coordinates of the curve). As previously discussed, the set of flow rate relationships may be associated with a single primary line. Accordingly, in certain embodiments, the controller may store multiple sets of flow rate relationships, in which each set of flow rate relationships is associated with a respective primary line.

During operation of the agricultural system, the controller may receive an agricultural product signal indicative of the agricultural product disposed within the storage tank. The controller may then select a selected flow rate relationship (e.g., the first flow rate relationship 96 or the second flow rate relationship 98) based on the agricultural product disposed within the storage tank. The controller may determine a target flow rate of the air flow through the primary line based on the selected flow rate relationship and the agricultural product flow rate. For example, the controller may use the selected flow rate relationship to identify the output air flow rate corresponding to the agricultural product flow rate (e.g., the input agricultural product flow rate), such as by using the equation of the curve of the selected flow rate relationship. The controller may then set the target air flow rate to the identified output air flow rate. Furthermore, the controller may control the air source to establish an air flow rate of the air flow through the primary line within a threshold range of the target air flow rate.

Figure 4:
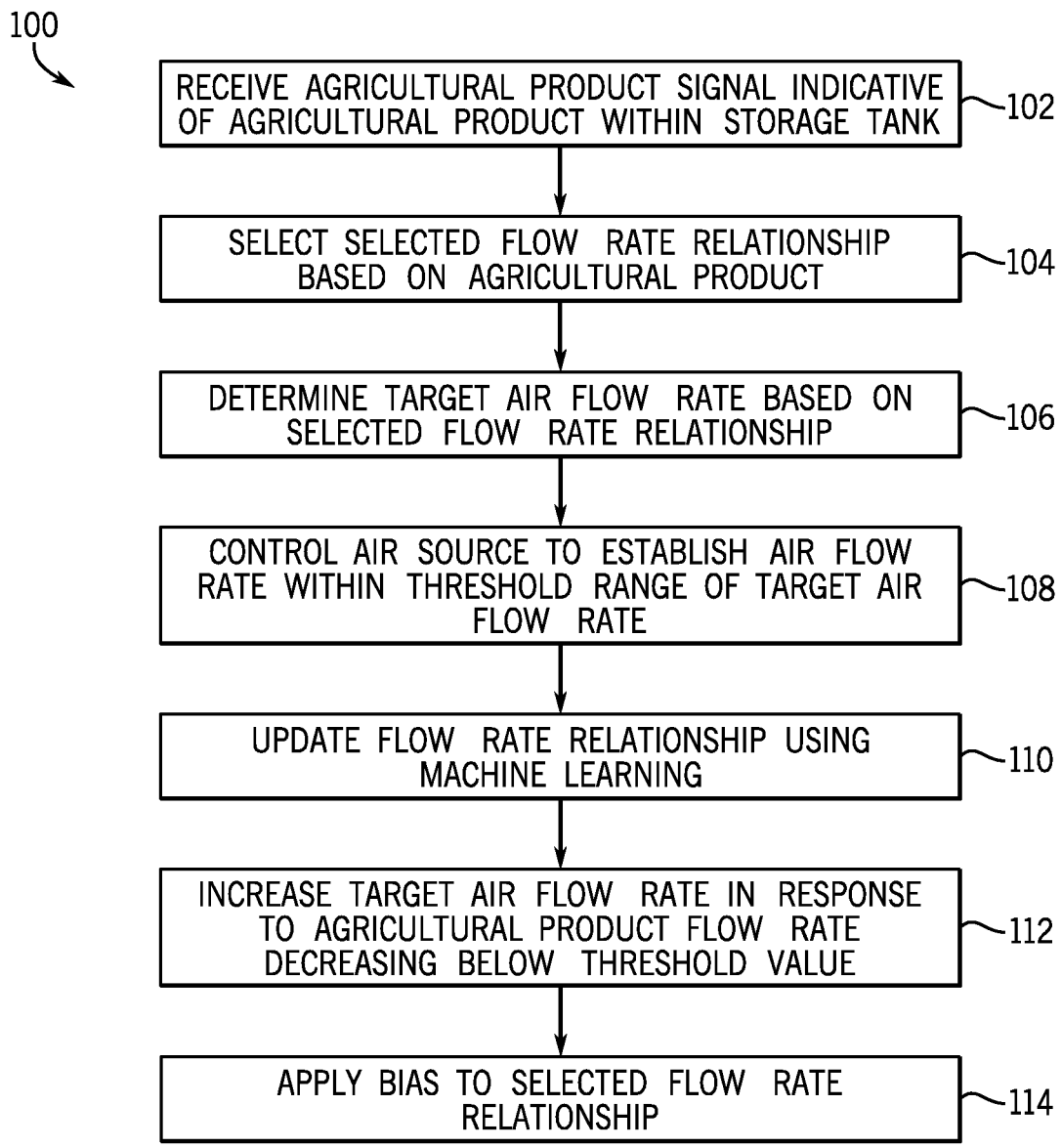
FIG. 4 is a flow diagram of an embodiment of a method for controlling an air flow through a primary line of an agricultural system.

FIG. 4 is a flow diagram of an embodiment of a method 100 for controlling an air flow through a primary line of an agricultural system. The method 100 may be performed by the controller disclosed above with reference to FIG. 2 or any other suitable controller(s). Furthermore, the steps of the method 100 may be performed in the order disclosed herein or in any other suitable order. For example, certain steps of the method 100 may be performed concurrently. In addition, in certain embodiments, at least one of the steps of the method 100 may be omitted.

In the illustrated embodiment, the method 100 includes receiving an agricultural product signal indicative of an agricultural product within a storage tank of an agricultural system, as represented by block 102. As previously discussed, the storage tank is configured to provide the agricultural product to a metering system of the agricultural system, and the metering system is configured to control an agricultural product flow rate of the agricultural product into a primary line of the agricultural system. Furthermore, as previously discussed, the agricultural product signal may be received from a user interface, or the agricultural product signal may be received from an agricultural product sensor configured to monitor the agricultural product within the storage tank.

Furthermore, the method 100 includes selecting a selected flow rate relationship from a set of flow rate relationships based on the agricultural product disposed within the storage tank, as represented by block 104. As previously discussed, each flow rate relationship of the set of flow rate relationships includes a set of input agricultural product flow rates and a corresponding set of output air flow rates for a respective input agricultural product. Each flow rate relationship may be represented as a table, a polynomial curve (e.g., quadratic curve, cubic curve, etc.), a spline (e.g., cubic spline, etc.), etc.

The method 100 also includes determining a target air flow rate of an air flow through the primary line based on the selected flow rate relationship and the agricultural product flow rate, as represented by block 106. For example, the selected flow rate relationship may be used to identify the output air flow rate corresponding to the agricultural product flow rate. The target air flow rate may then be set to the identified output air flow rate. Furthermore, as previously discussed, the agricultural product flow rate may be determined based on the rotation rate of the respective meter roller of the metering system, or the agricultural product flow rate may be determined based at least in part on an agricultural product prescription, a ground speed of the agricultural system, and a lateral extent of row units configured to receive the agricultural product from the primary line.

Furthermore, the method 100 includes controlling an air source to establish an air flow rate of the air flow through the primary line within a threshold range of the target air flow rate, as represented by block 108. For example, a rotation speed and/or a blade angle of a fan of the air source may be controlled to establish the air flow rate within the threshold range of the target air flow rate. The steps of determining the target air flow rate, as represented by block 106, and controlling the air source, as represented by block 108, may be iteratively repeated during operation of the agricultural system. For example, the steps represented by block 106 and 108 may be iteratively repeated at a suitable interval (e.g., 0.5 seconds, 1 second, 2 seconds, 5 seconds, 10 seconds, 30 seconds, 60 seconds, etc.).

In certain embodiments, the method 100 includes updating at least one flow rate relationship of the set of flow rate relationships using machine learning based on operation of the agricultural system within a field, as represented by block 110. As previously discussed, in certain embodiments, the machine learning process may be trained based on application of the bias to the selected flow rate relationship. Furthermore, in certain embodiments, the machine learning process may be trained based on detection of plugging conditions/impending plugging conditions and/or detection of high agricultural product output speeds (e.g., resulting in high impact forces between the agricultural product and the soil and/or reduction in placement accuracy of the particles of the agricultural product relative to the trench formed in the soil). While training the machine learning process based on application of the bias and detection of plugging conditions/impending plugging conditions/high agricultural product output speeds is disclosed above, the machine learning process may be trained using other suitable data. In addition, as previously discussed, the machine learning process may be trained based on data from the agricultural system and/or other agricultural system(s).

Furthermore, in certain embodiments, the method 100 includes increasing the target air flow rate in response to the agricultural product flow rate decreasing below a threshold value, as represented by block 112. For example, during a headland turn and/or while repositioning the agricultural system, the agricultural product flow rate may be set to zero, such that the agricultural product is not deposited within the soil at the headland/along the repositioning path. In response to the agricultural product flow rate decreasing below a threshold value, the target air flow rate is increased (e.g., above the output air flow rate provided by the selected flow rate relationship), thereby causing the air source to output a base air flow rate. Accordingly, when the agricultural product flow rate increases (e.g., at the end of the headland turn, at the end of the repositioning maneuver), the air flow rate may correspondingly increase in a shorter time period, thereby increasing the efficiency of the seeding operation.

In addition, in certain embodiments, the method 100 includes applying a bias to the selected flow rate relationship to increase or decrease the set of output air flow rates, as represented by block 114. For example, during the seeding operation, a plugging condition or an impending plugging condition may be detected. In response to detecting the plugging condition or the impending plugging condition, the bias may be applied to the selected flow rate relationship to increase the set of output air flow rates, thereby reducing/terminating the plugging condition or reducing the possibility of the impending plugging condition becoming a plugging condition. Additionally or alternatively, during the seeding operation, high agricultural product output speeds may be detected. In response to detecting the high agricultural product output speeds, the bias may be applied to the selected flow rate relationship to decrease the set of output air flow rates, thereby reducing the agricultural product output speeds.

Figure 5:
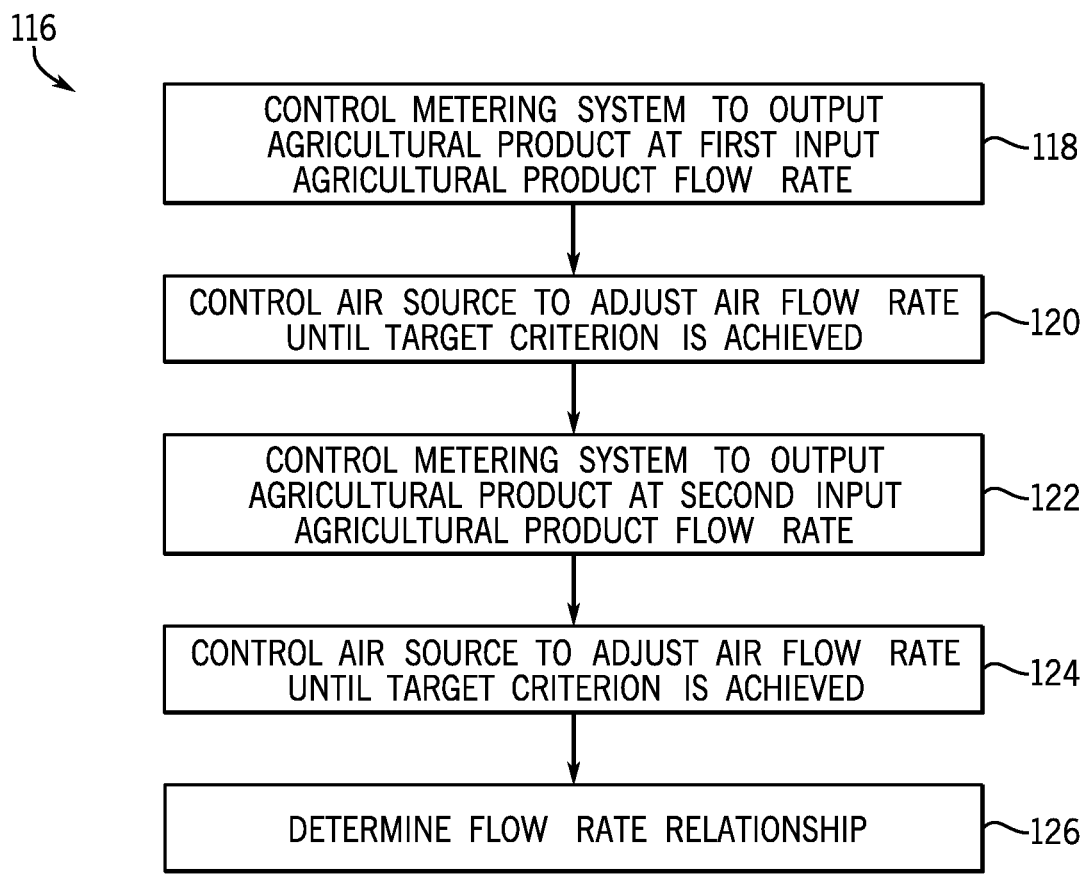
FIG. 5 is a flow diagram of an embodiment of a method for determining a flow rate relationship via a calibration process.

FIG. 5 is a flow diagram of an embodiment of a method 116 for determining a flow rate relationship via a calibration process. The method 116 (e.g., calibration process) may be performed by the controller disclosed above with reference to FIG. 2 or any other suitable controller(s). Furthermore, the steps of the method 116 may be performed in the order disclosed herein or in any other suitable order. For example, certain steps of the method 116 may be performed concurrently. In addition, in certain embodiments, at least one of the steps of the method 116 may be omitted.

The method 116 for determining a flow rate relationship via a calibration process may be performed after the agricultural product is disposed within the storage tank and prior to the seeding operation. In the illustrated embodiment, the method 116 (e.g., calibration process) includes controlling the metering system to output the respective input agricultural product at a first input agricultural product flow rate of the set of input agricultural product flow rates, as represented by block 118. The method 116 also includes controlling the air source to adjust the air flow rate until a target criterion is achieved to establish a first air flow value, as represented by block 120. As previously discussed, the first air flow value may correspond to the air flow rate of the air flow through the primary line when the target criterion is achieved. Furthermore, the method 116 includes controlling the metering system to output the respective input agricultural product at a second input agricultural product flow rate of the set of input agricultural product flow rates, as represented by block 122. The method 116 also includes controlling the air source to adjust the air flow rate until the target criterion is achieved to establish a second air flow value, as represented by block 124. As previously discussed, the second air flow value may correspond to the air flow rate of the air flow through the primary line when the target criterion is achieved. In addition, the method 116 includes determining the flow rate relationship based on the first input agricultural product flow rate, the first air flow value, the second input agricultural product flow rate, and the second air flow value, as represented by block 126. While the method 116 (e.g., calibration process) includes two iterations for determining two air flow values (e.g., blocks 118 to 124) in the illustrated embodiment, in certain embodiments, the method (e.g., calibration process) may include additional iterations to determine additional air flow values. For example, the method (e.g., calibration process) may include determining 3, 4, 5, 6, 7, 8, 9, 10, or more air flow values.

As previously discussed, the target criterion may be selected to achieve an air flow rate that reduces the possibility of plugging and reduces the impact of the agricultural product onto the soil. For example, the target criterion may include a target height of a flow of the agricultural product from a distribution line pointed upwardly or another suitable target criterion. As previously discussed, the flow rate relationship may be determined by storing each input agricultural product flow rate set during the calibration process (e.g., the first input agricultural product flow rate, the second input agricultural product flow rate, etc.) and each air flow value determined during the calibration process (e.g., the first air flow value, the second air flow value, etc.) in a table. Furthermore, as previously discussed, the flow rate relationship may be determined by generating a curve fit through the input agricultural product flow rates set during the calibration process (e.g., the first input agricultural product flow rate, the second input agricultural product flow rate, etc.) and the air flow values determined during the calibration process (e.g., the first air flow value, the second air flow value, etc.). While determining one flow rate relationship via the method 116 (e.g., calibration process) is disclosed above, in certain embodiments, multiple flow rate relationships of the set of flow rate relationships may be determined via the method 116 (e.g., calibration process), in which each flow rate relationship is determined for a different agricultural product. Furthermore, in certain embodiments, the method 116 (e.g., calibration process) may be performed for each primary line to establish at least one flow rate relationship of the set of flow rate relationships for the primary line. After the calibration process is complete, the determined flow rate relationship may be stored (e.g., for use during the present seeding operation, for use during future seeding operations, etc.) and/or output (e.g., to a remote server, to other agricultural systems, etc.) for use by other agricultural systems.

While determining the target air flow rate through the primary line based on the selected flow rate relationship and the agricultural product flow rate is disclosed above, in certain embodiments, the target air flow rate may be determined via other suitable techniques. In such embodiments, the controller may control the air source to establish an air flow rate through the primary line based on the target air flow rate (e.g., such that the air flow rate is within a threshold range of the target air flow rate). As previously discussed, the air flow rate through the primary line may be determined based on feedback from the air flow sensor. In certain embodiments, the air flow sensor may be configured to monitor a mass air flow rate, and the target air flow rate may be a target mass air flow rate. In such embodiments, the controller may control the air source to establish a mass air flow rate through the primary line based on the target mass air flow rate (e.g., such that the mass air flow rate is within a threshold range of the target air flow rate). Using the mass air flow rate may substantially reduce or eliminate the effect of air density variations on the air source control process (e.g., as compared to using the volumetric flow rate).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An air flow control system for an agricultural system, comprising:
  a controller comprising a memory and a processor, wherein the controller is configured to:
    receive an agricultural product signal indicative of an agricultural product disposed within a storage tank of the agricultural system, wherein the storage tank is configured to provide the agricultural product to a metering system of the agricultural system, and the metering system is configured to control an agricultural product flow rate of the agricultural product into a primary line of the agricultural system;
    select a selected flow rate relationship from a plurality of flow rate relationships based on the agricultural product disposed within the storage tank, wherein each flow rate relationship of the plurality of flow rate relationships comprises a plurality of input agricultural product flow rates and a corresponding plurality of output air flow rates for a respective input agricultural product;
    determine a target air flow rate of an air flow through the primary line based on the selected flow rate relationship and the agricultural product flow rate; and
    control an air source to establish an air flow rate of the air flow through the primary line within a threshold range of the target air flow rate.

2. The air flow control system of claim 1, comprising an air flow sensor communicatively coupled to the controller, wherein the air flow sensor is configured to output an air flow signal indicative of the air flow rate of the air flow through the primary line.

3. The air flow control system of claim 1, comprising:
  a user interface communicatively coupled to the controller, wherein the user interface is configured to output the agricultural product signal in response to user input; or
  an agricultural product sensor communicatively coupled to the controller, wherein the agricultural product sensor is configured to monitor the agricultural product within the storage tank and output the agricultural product signal.

4. The air flow control system of claim 1, wherein the controller is configured to determine a flow rate relationship of the plurality of flow rate relationships via a calibration process comprising:
  controlling the metering system to output the respective input agricultural product at a first input agricultural product flow rate of the plurality of input agricultural product flow rates;
  controlling the air source to adjust the air flow rate until a target criterion is achieved to establish a first air flow value;
  controlling the metering system to output the respective input agricultural product at a second input agricultural product flow rate of the plurality of input agricultural product flow rates;
  controlling the air source to adjust the air flow rate until the target criterion is achieved to establish a second air flow value; and
  determining the flow rate relationship based on the first input agricultural product flow rate, the first air flow value, the second input agricultural product flow rate, and the second air flow value.

5. The air flow control system of claim 1, wherein the controller is configured to update at least one flow rate relationship of the plurality of flow rate relationships using machine learning based on operation of the agricultural system within a field.

6. The air flow control system of claim 1, wherein the controller is configured to increase the target air flow rate in response to the agricultural product flow rate decreasing below a threshold value.

7. The air flow control system of claim 1, wherein the controller is configured to apply a bias to the selected flow rate relationship to increase or decrease each of the plurality of output air flow rates.

8. The air flow control system of claim 1, wherein the controller is configured to determine the agricultural product flow rate based at least in part on an agricultural product prescription, a ground speed of the agricultural system, and a lateral extent of a plurality of row units configured to receive the agricultural product from the primary line.

9. An agricultural system, comprising:
   an air source configured to output an air flow;
   a primary line extending from the air source and configured to receive the air flow;
   a metering system configured to control an agricultural product flow rate of agricultural product into the primary line; and
   an air flow control system, comprising a controller comprising a memory and a processor, wherein the controller is configured to:
      receive an agricultural product signal indicative of the agricultural product;
      select a selected flow rate relationship from a plurality of flow rate relationships based on the agricultural product, wherein each flow rate relationship of the plurality of flow rate relationships comprises a plurality of input agricultural product flow rates and a corresponding plurality of output air flow rates for a respective input agricultural product;
      determine a target air flow rate of the air flow based on the selected flow rate relationship and the agricultural product flow rate; and
      control the air source to establish an air flow rate of the air flow within a threshold range of the target air flow rate.

10. The agricultural system of claim 9, wherein the airflow control system comprises an air flow sensor communicatively coupled to the controller, and the air flow sensor is configured to output an air flow signal indicative of the air flow rate of the air flow through the primary line.

11. The agricultural system of claim 9, wherein the controller is configured to update at least one flow rate relationship of the plurality of flow rate relationships using machine learning based on operation of the agricultural system within a field.

12. The agricultural system of claim 9, wherein the controller is configured to increase the target air flow rate in response to the agricultural product flow rate decreasing below a threshold value.

13. The agricultural system of claim 9, wherein the controller is configured to apply a bias to the selected flow rate relationship to increase or decrease each of the plurality of output air flow rates.

14. The agricultural system of claim 9, wherein the controller is configured to determine the agricultural product flow rate based at least in part on an agricultural product prescription, a ground speed of the agricultural system, and a lateral extent of a plurality of row units configured to receive the agricultural product from the primary line.

15. The agricultural system of claim 9, wherein the air flow control system comprises:
   a user interface communicatively coupled to the controller, wherein the user interface is configured to output the agricultural product signal in response to user input; or
   an agricultural product sensor communicatively coupled to the controller, wherein the agricultural product sensor is configured to monitor the agricultural product within the storage tank and output the agricultural product signal.

16. A method for controlling an air flow through a primary line of an agricultural system, comprising:
   receiving, via a controller comprising a memory and a processor, an agricultural product signal indicative of an agricultural product disposed within a storage tank of the agricultural system, wherein the storage tank is configured to provide the agricultural product to a metering system of the agricultural system, and the metering system is configured to control an agricultural product flow rate of the agricultural product into the primary line;
   selecting, via the controller, a selected flow rate relationship from a plurality of flow rate relationships based on the agricultural product disposed within the storage tank, wherein each flow rate relationship of the plurality of flow rate relationships comprises a plurality of input agricultural product flow rates and a corresponding plurality of output air flow rates for a respective input agricultural product;
   determining, via the controller, a target air flow rate of the air flow through the primary line based on the selected flow rate relationship and the agricultural product flow rate; and
   controlling, via the controller, an air source to establish an air flow rate of the air flow through the primary line within a threshold range of the target air flow rate.

17. The method of claim 16, comprising determining, via the controller, a flow rate relationship of the plurality of flow rate relationships via a calibration process comprising:
   controlling, via the controller, the metering system to output the respective input agricultural product at a first input agricultural product flow rate of the plurality of input agricultural product flow rates;
   controlling, via the controller, the air source to adjust the air flow rate until a target criterion is achieved to establish a first air flow value;
   controlling, via the controller, the metering system to output the respective input agricultural product at a second input agricultural product flow rate of the plurality of input agricultural product flow rates;
   controlling, via the controller, the air source to adjust the air flow rate until the target criterion is achieved to establish a second air flow value; and
   determining, via the controller, the flow rate relationship based on the first input agricultural product flow rate, the first air flow value, the second input agricultural product flow rate, and the second air flow value.

18. The method of claim 16, comprising updating, via the controller, at least one flow rate relationship of the plurality of flow rate relationships using machine learning based on operation of the agricultural system within a field.

19. The method of claim 16, comprising increasing, via the controller, the target air flow rate in response to the agricultural product flow rate decreasing below a threshold value.

20. The method of claim 16, comprising applying, via the controller, a bias to the selected flow rate relationship to increase or decrease each of the plurality of output air flow rates.

* * * * *